US012705703B2

(12) United States Patent
Riquelme Ruiz et al.

(10) Patent No.: US 12,705,703 B2
(45) Date of Patent: Aug. 11, 2026

(54) PROCESSING IMAGES USING MIXTURE OF EXPERTS

(71) Applicant: Google LLC, Mountain View, CA (US)

(72) Inventors: Carlos Riquelme Ruiz, Zurich (CH); André Susano Pinto, Zurich (CH); Basil Mustafa, Zurich (CH); Daniel M. Keysers, Stallikon (CH); Joan Puigcerver i Perez, Zurich (CH); Maxim Neumann, Zurich (CH); Neil Matthew Tinmouth Houlsby, Zurich (CH); Rodolphe Jenatton, Berlin (DE)

(73) Assignee: Google LLC, Mountain View, CA (US)

( * ) Notice: Subject to any disclaimer, the term of this patent is extended or adjusted under 35 U.S.C. 154(b) by 248 days.

(21) Appl. No.: 18/564,915

(22) PCT Filed: May 27, 2022

(86) PCT No.: PCT/US2022/031466

§ 371 (c)(1),
(2) Date: Nov. 28, 2023

(87) PCT Pub. No.: WO2022/251717

PCT Pub. Date: Dec. 1, 2022

(65) Prior Publication Data

US 2024/0289926 A1 Aug. 29, 2024

Related U.S. Application Data

(60) Provisional application No. 63/194,926, filed on May 28, 2021.

(51) Int. Cl.
*G06T 5/60* (2024.01)

(52) U.S. Cl.
CPC ...... *G06T 5/60* (2024.01); *G06T 2207/20084* (2013.01)

(58) Field of Classification Search
CPC . G06T 5/60; G06T 2207/20084; G06N 3/045; G06N 3/0495; G06N 3/0499;
(Continued)

(56) References Cited

U.S. PATENT DOCUMENTS

2020/0184278 A1 6/2020 Zadeh et al.

FOREIGN PATENT DOCUMENTS

CN 109923558 A 6/2019
WO WO 2018085697 A1 5/2018

OTHER PUBLICATIONS

Arnab et al., "ViViT: A Video Vision Transformer," CoRR, Submitted on Mar. 29, 2021, arXiv:2103.15691v1, 13 pages.

(Continued)

*Primary Examiner* — Charlotte M Baker
(74) *Attorney, Agent, or Firm* — Fish & Richardson P.C.

(57) ABSTRACT

Methods, systems, and apparatus, including computer programs encoded on computer storage media, for generating predictions about images. One of the systems includes a neural network comprising a sequence of one or more network blocks that are each configured to perform operations comprising: obtaining a block input that represents an intermediate representation of an input image; determining a plurality of patches of the block input or of an updated representation of the block input, wherein each patch comprises a different subset of elements of the block input or of the updated representation of the block input; assigning each patch to one or more respective expert modules of a plurality of expert modules of the network block; for each patch of the plurality of patches, processing the patch using the corresponding expert modules to generate respective module outputs; and generating a block output by combining the module outputs.

20 Claims, 4 Drawing Sheets

(58) Field of Classification Search
CPC ...... G06N 3/082; G06N 3/0895; G06N 3/048; G06N 3/084; G06N 3/09; G06N 3/088; G06V 10/82; G06V 10/94
USPC .......................................................... 382/100
See application file for complete search history.

(56) References Cited

OTHER PUBLICATIONS

Bengio et al., "Conditional Computation in Neural Networks for faster models," CoRR, Submitted on Jan. 7, 2016, arXiv:1511.06297v2, 12 pages.
Bengio et al., "Estimating or Propagating Gradients Through Stochastic Neurons for Conditional Computation," CoRR, Submitted on Aug. 15, 2013, arXiv:1308.3432v1, 12 pages.
Bengio, "Deep learning of representations: Looking forward," Paper, Presented at International Conference on Statistical Language and Speech Processing, Tarragona, Spain, Jul. 29-31, 2013, 37 pages.
Chen et al., "Improved learning algorithms for mixture of experts in multiclass classification," Neural Networks, Feb. 26, 1999, 12(9):1229-1252.
Dhillon et al., "A Baseline for Few-Shot Image Classification," CoRR, Submitted on Oct. 21, 2020, arXiv:1909.02729v5, 20 pages.
Dosovitskiy et al., "An image is worth 16x16 words: Transformers for image recognition at scale," CoRR, Submitted on Oct. 22, 2020, arXiv:2010.11929v1, 21 pages.
Eigen et al., "Learning factored representations in a deep mixture of experts," CoRR, Submitted on Mar. 9, 2014, arXiv:1312.4314v3, 8 pages.
Fedus et al., "Switch transformers: Scaling to trillion parameter models with simple and efficient sparsity," CoRR, Submitted on Jan. 11, 2021, arXiv:2101.03961v1, 31 pages.
Gavrila et al., "Multi-cue pedestrian detection and tracking from a moving vehicle," International Journal of Computer Vision, May 4, 2006, 73(1):41-59.
Hu et al., "A patient-adaptable ECG beat classifier using a mixture of experts approach," IEEE transactions on biomedical engineering, Sep. 30, 1997, 44(9):891-900.
International Preliminary Report on Patentability in International Appln. No. PCT/US2022/031466, mailed on Dec. 7, 2023, 9 pages.
International Search Report and Written Opinion in International Appln. No. PCT/US2022/031466, mailed on Oct. 5, 2022, 15 pages.
Jacobs et al., "Adaptive mixtures of local experts," Neural Computation, Mar. 1991, 3(1):79-87.
Jordan et al., "Hierarchical mixtures of experts and the EM algorithm," Neural Computation, Mar. 1994, 6(2):1339-1344.
Kolesnikov et al., "Big transfer (BiT): General visual representation learning," CoRR, Submitted on May 5, 2020, arXiv:1912.11370v3, 28 pages.
Lakshminarayanan et al., "Simple and scalable predictive uncertainty estimation using deep ensembles," CoRR, Submitted on Nov. 4, 2017, arXiv:1612.01474v3, 15 pages.
Lee et al., "ME R-CNN: Multi-Expert R-CNN for Object Detection," IEEE Transactions on Image Processing, Sep. 9, 2019, 29:1030-1044.
Lepikhin et al., "Gshard: Scaling giant models with conditional computation and automatic sharding," CoRR, Submitted on Jun. 30, 2020, arXiv:2006.16668v1, 35 pages.
Lewis et al., "BASE layers: Simplifying training of large, sparse models," CoRR, Submitted on Mar. 30, 2021, arXiv:2103.16716v1, 11 pages.
Office Action in Japanese Appln. No. 2023-556541, mailed on Oct. 28, 2024, 9 pages (with English translation).
Raffel et al., "Exploring the limits of transfer learning with a unified text-to-text transformer," CoRR, Submitted on Jul. 28, 2020, arXiv:1910.10683v3, 67 pages.
Shazeer et al., "Outrageously large neural networks: The sparsely-gated mixture-of-experts layer," CoRR, Submitted on Jan. 23, 2017, arXiv:1701.06538v1, 19 pages.
Sminchisescu et al., "Learning to reconstruct 3D human motion from bayesian mixtures of experts. a probabilistic discriminative approach," Technical Report, University of Toronto Department of Computer Science, Oct. 2004, CSRG-502, 28 pages.
Sun et al., "Revisiting unreasonable effectiveness of data in deep learning era," Paper, Presented at IEEE conference on computer vision, Venice, Italy, Oct. 22-29, 2017, 10 pages.
Tani et al., "Learning to perceive the world as articulated: an approach for hierarchical learning in sensory-motor systems," Neural Networks, published on Oct. 1, 1999, 12(7-8):1131-1141.
Vaswani et al., "Attention is all you need," Paper, Presented at 31st Conference on Neural Information Processing Systems, Long Beach, CA, Dec. 4-9, 2017; Advances in Neural Information Processing Systems 30, Dec. 2017, 11 pages.
Yuksel et al., "Twenty years of mixture of experts," IEEE transactions on neural networks and learning systems, Jun. 11, 2012, 23(8):1177-1193.
Zeevi et al., "Time series prediction using mixtures of experts," Paper, Presented at 26th Conference on Neural Information Processing Systems, Lake Tahoe, Nevada, Dec. 3-6, 2012; Advances in Neural Information Processing Systems 25, Dec. 2012, 10 pages.
Zhai et al., "A large-scale study of representation learning with the visual task adaptation benchmark," CoRR, Submitted on Feb. 21, 2020, arXiv:1910.04867v2, 33 pages.
Office Action in Indian Appln. No. 202327057184, mailed on Jun. 6, 2025, 8 pages.
Notice of Allowance in Japanese Appln. No. 2023-556541, mailed on Mar. 25, 2025, 7 pages (with machine translation).
Lee et al., "ME R-CNN: Multi-Expert R-CNN for Object," IEEE Transactions on Image Processing, 2020, 15 pages.
Office action issued in Chinese Appln. No. 202280020920.2, mailed on Dec. 24, 2025, 10 pages (with English translation).
Makhsoos et al., "A modified Mixture of FMLP Experts for face recognition," 2008 7th IEEE International Conference on Cybernetic Intelligent systems, 2008, 6 pages.
Office Action in European Appln. No. 22736063.3, mailed on Jan. 21, 2026, 11 pages.

PROCESSING IMAGES USING MIXTURE OF EXPERTS

CROSS-REFERENCE TO RELATED APPLICATIONS

This application is a National Stage Application under 35 U.S.C. § 371 and claims the benefit of International Application No. PCT/US2022/031466, filed May 27, 2022, which claims the benefit of priority under 35 U.S.C. § 119 to U.S. Provisional Application Ser. No. 63/194,926, filed May 28, 2021, the entirety of which is incorporated herein by reference.

BACKGROUND

This specification relates to processing images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that is configured to process an image using a neural network and to generate a network output characterizing the image. The neural network includes a sequence of one or more network blocks that are each configured to process a block input that includes the image or an intermediate representation of the image and to generate a block output.

At least one of the network blocks is an expert network block that includes a set of multiple different expert modules that are each configured to process a proper subset of the elements of the block input. In particular, an expert network block is configured to identify multiple "patches" of elements of the block input and, for each patch, process the patch using a routing module to identify a proper subset of the expert modules to which to route the patch. Each expert module then processes, for each patch routed to the expert module, the patch to generate a respective expert module output for the routed patch. The expert network block can then combine, for each patch, the corresponding expert module outputs generated by respective expert modules in response to processing the patch, to generate a respective patch output. The expert network block can then compose the patch outputs corresponding to each patch of the block input together to generate a block output, where the patch outputs have the same spatial relationships to each other in the block output as the corresponding patches have in the block input.

The subject matter described in this specification can be implemented in particular embodiments so as to realize one or more of the following advantages.

Some existing systems process images using "dense" feedforward neural networks, i.e., feedforward neural networks that process, for each neural network layer of the feedforward neural network, every element of the layer input to the neural network layer using every network parameter of the neural network layer. With large models configured to process high-resolution images, such dense neural networks can require significant time and computational resources to process a single image. Using techniques described in this specification, a system can process images using a feedforward neural network by selectively activating subsets of the parameters of the neural network based on the network input, significantly improving the time and computational efficiency of the processing of the image. Furthermore, introducing this sparsity can allow the feedforward neural network to include many more network parameters than was previously feasible, since only a subset of the parameters are used to process any given input.

Using techniques described in this specification, a system can implement a neural network that includes an expert network block with multiple expert modules such that each expert module has been configured through training to process different types of images (or different types of image patches), allowing the modules to "specialize" and further improving the efficiency and performance of the neural network.

As described in this specification, a self-attention based neural network configured to process images can require far fewer computations to achieve the same performance as a state-of-the-art convolutional neural network. Put another way, for a fixed compute budget, the self-attention based neural network performs better (e.g., as measured by testing accuracy, precision, recall, and so on) than a convolutional neural network configured to perform the same machine learning task on the images. This is because applying self-attention is generally more computationally efficient than convolving a kernel across an entire image, as the self-attention mechanism is able to attend to different regions of the image with fewer computations than convolution.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that is configured to compile computer program modules using a just-in-time compiler and a compilation cache.

Figure 1A:
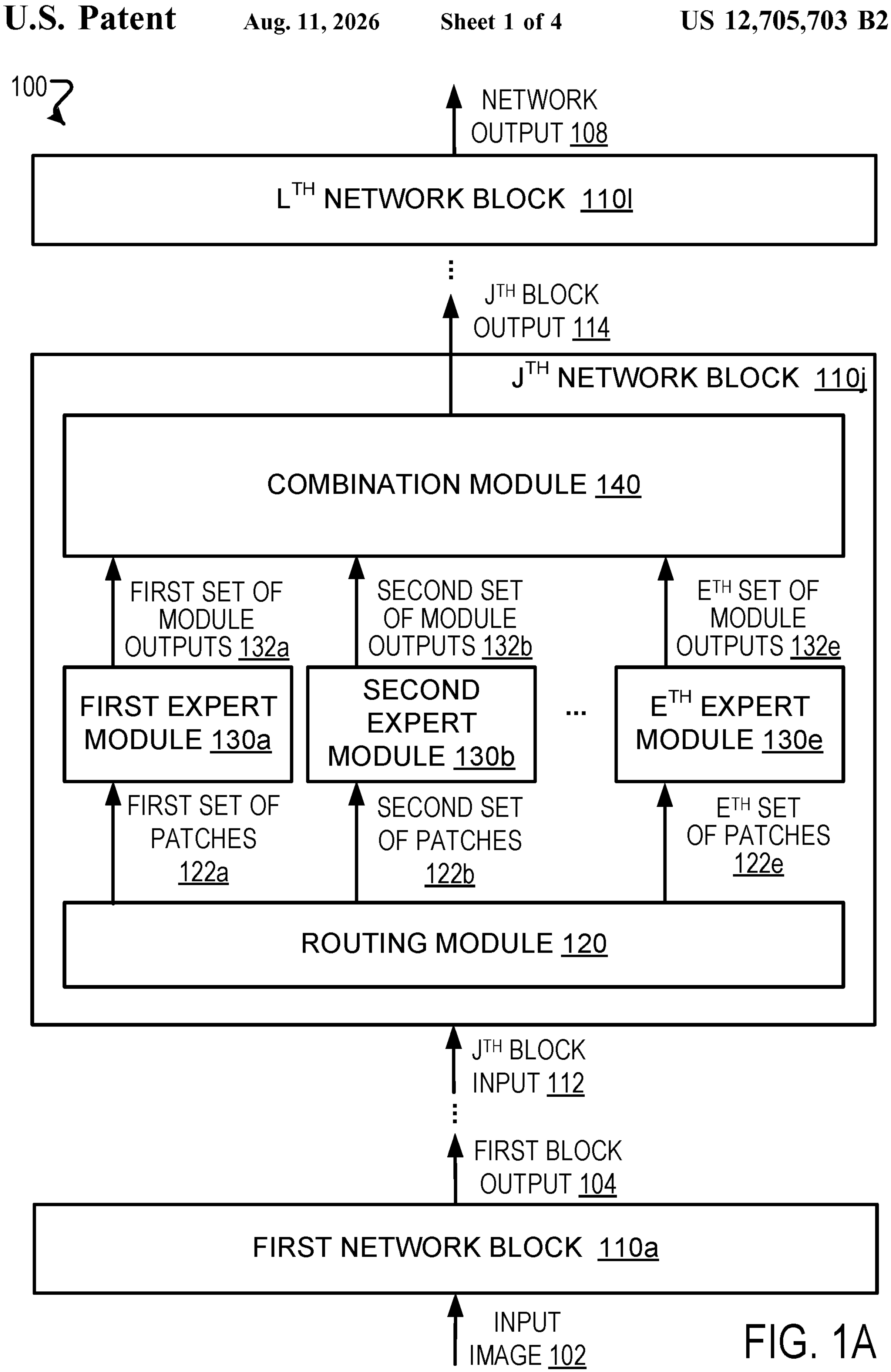
FIG. 1A is a diagram of an example neural network that is configured to generate predictions about images.

FIG. 1A is a diagram of an example neural network 100. The neural network 100 is an example of a system implemented as computer programs on one or more computers in one or more locations, in which the systems, components, and techniques described below can be implemented.

The neural network 100 is configured to process an input image 102 according to a set of trained network parameters to generate a network output 108 that represents an embedding of the input image 102 or a prediction about the input image 102. The neural network 100 can be configured to perform any appropriate machine learning task using the input image 102. Example machine learning tasks are discussed below. In this specification, processing an image refers to processing the intensity values of the pixels of the image.

The neural network 100 includes a sequence of L network blocks 110*a*-*l*, where L≥1. Each network block 110*a*-*l* can be configured to process a block input that includes the image or an intermediate representation of the image and to generate a block output.

As depicted in FIG. 1A, the first network block 110*a* in the sequence of network blocks 110*a*-*l* is configured to process the image 102 itself to generate a first block output 104 that is an intermediate representation of the image 102. Each subsequent network block 110*b*-1 can then process the block output of the previous network block in the sequence. That is, the block input for the $(i+1)^{th}$ network block 110*a*-*n* is the block output of the $i^{th}$ network block 110*a*-*l*.

In some other implementations, first network block 110*a* is configured to process an embedding of the input image 102 instead of the input image 102 itself. For example, although the below description generally refers to the neural network processing the image 102, in some implementations the neural network 100 can be configured to receive as input an embedding of the image 102, e.g., an embedding generated by a different neural network in response to processing the image 102.

In some implementations, the network output 108 for the neural network 100 is the block output of the final network block 110*l* in the sequence in the sequence of network blocks 110*a*-*l*. For example, as described in more detail below, the block output of the final network block 110*l* can include a respective updated representation for each of multiple patches of the input image 102, and thus collectively the block output can represent an embedding of the input image 102 that can be stored or further processed, e.g., by one or more downstream machine learning models.

In some other implementations, the block output of the final network block 110*a*-*l* in the sequence is further processed using one or more neural network layers to generate the network output 108 for the neural network 100. For example, if the neural network 100 is configured to classify the input image 102, the neural network 100 can process the block output of the final network block 110*a*-1 in the sequence using one or more neural network layers that includes a final logistic layer or softmax layer to generate a network output 108 that identifies, for each class in a set of candidate classes, a value representing the likelihood that the input image 102 belongs to the class.

As a particular example, the neural network 100 can include one or more "head" subnetworks that are each configured to process the block output of the final network block 110*a*-*l* in the sequence using one or more neural network layers to generate predictions about the input image 102 for respective different machine learning tasks. That is, after the neural network 100 has been trained, the output of the final network block 110*a*-1 in the sequence (which can be considered an embedding of the input image 102) can encode information useful for multiple different machine learning tasks.

In some implementations, the neural network 100 first processes the input image 102 to determine a set of patches of the input image, e.g., to determine an input sequence that includes multiple elements representing the determined patches of the input image 102. The neural network 100 can then process the determined patches (or embeddings of the determined patches generated by one or more initial neural network layers of the neural network 100 or by a different neural network) using the sequence of network blocks 110*a*-*l*. In some other implementations, one or more of the network blocks 110*a*-*l* each determine a set of patches of the block input to the network block 110*a*-*l* (which is an intermediate representation of the input image 102), and processes the determined patches to generate a block output for the network block 110*a*-*l*. The operations of the network blocks 110-*al* are described in more detail below.

In some implementations, the neural network 100 processes one or more other network inputs in addition to the input image 102. For example, the neural network 100 can process data identifying a class to which the input image 102 belongs. As another example, the neural network 100 can process a text input corresponding to the input image 102, e.g., a text input representing text characterizing the input image 102.

As another example, e.g., in implementations in which the neural network 100 determines a sequence of patches of the input image 102 (or embeddings thereof) to be successively updated by the sequence of network blocks 110*a*-1, the neural network 100 can process a predetermined token, sometimes called a "class" token. That is, the predetermined token can be the same for each input image 102 received by the neural network 100, e.g., a predetermined tensor. For example, the predetermined token can be machine-learned, e.g., concurrently with the training of the neural network 100. As a particular example, the predetermined token can be appended to the sequence of patches processed by the neural network 100, such that each network block in the sequence of network blocks 110*a*-1 generates an updated representation for the predetermined token. In some implementations, the network output 108 is (or includes) the final representation of the predetermined token generated by the final network block 110*l*, where the final representation can be considered an embedding of the input image 102.

Some or all of the network blocks 110*a*-1 include a respective set of multiple different expert modules. In this specification, an expert module is a component of a network block that is configured to process a strict subset of the elements, i.e., less than all of the elements, of the block input to the network block. An expert module can be configured to process the strict subset of the elements of the block input using one or more neural network layers to generate an updated representation of the strict subset of elements. In this specification, a network block that includes multiple expert modules is also called an expert network block.

For example, each network block 110*a*-1 in the sequence can be an expert network block. As another example, every second network block 110*a*-1 in the sequence can be an expert network block. As another example, every second network block 110*a*-1 in the sequence, up to a particular network block 110*i*, i<l, can be an expert network block.

For example, as depicted in FIG. 1, the $j^{th}$ network block 110*j* in the sequence of network blocks 110*a*-*l* is an expert network block that includes e expert modules 130*a*-*e*, where e>1. The below description refers specifically to the $j^{th}$ network block 110*j*, but it is to be understood that the same techniques can be implemented for each expert network block in the neural network 100.

The $j^{th}$ network block can segment its block input 112 into multiple patches, where each patch includes a different subset of the elements of the block input 112. For example, if the block input 112 is a three-dimensional representation of the input image 102, then the $j^{th}$ network block 110*j* can determine each patch to have dimensionality L×W×C, where C represents the number of channels of the representation of the input image 102 (e.g., C=3 if the block input 112 is an RGB image or a larger number if the block input 112 is an intermediate representation of an RGB image).

In some implementations, each patch of the block input 112 is the same size, i.e., includes the same number of elements and has the same dimensionality. In some other implementations, different patches can be different sizes, e.g., can include different numbers of elements.

In some implementations, each element of the block input 112 is in exactly one patch. In some other implementations, some or all of the elements of the block input 112 can be in multiple different patches; that is, the patches of the block input 112 can overlap.

In some implementations, each network block 110*a*-1 in the sequence of network blocks processes the same set patches of the input image 102. That is, each block input and block output can have the same dimensionality, such that the number of patches, the size of the patches, and the spatial relationships of the patches determined by each network block 110*a*-*l* is the same. For example, the neural network 100 can process the input image 102 to determine an input sequence of patches of the input image 102, and then process the respective updated representations of the determined sequence of patches using each network block 110*a*-1 in the sequence of network blocks.

The patches of the block input 112 can be represented in any appropriate way. For example, each patch can be represented as a two-dimensional tensor that includes the elements of the block input 112, e.g., a tensor that maintains the spatial relationships of the elements in the block input 112. As another example, each patch can be represented as a one-dimensional sequence of the elements of the patch. As a particular example, if the patch is a two-dimensional region of the block input 112, then the patch can be a flattened version of the two-dimensional region, e.g., where the elements of the block input 112 are ordered in a one-dimensional tensor according to their respective positions in the block input 112. As another example, each initial image patch 112*a*-*n* can be represented as an unordered set of the pixels of the initial image patch 112*a*-*n*.

Example techniques for determining patches of an image or an intermediate representation of an image are discussed below with reference to FIG. 2.

After determining the patches of the block input 112, the $j^{th}$ network block 110*j* can assign, using a routing module 120, each patch to one or more of the expert modules 130*a*-*e* of the $j^{th}$ network block 110*j*. The $j^{th}$ network block can then process each image patch using the corresponding assigned expert modules 130*a*-*e* to generate respective expert module outputs, and combine the expert module outputs of the expert modules 130*a*-*e* using a combination module 140 to generate the block output 114 for the the network block 110*j*.

In other words, the routing module 120 is configured to determine, for each expert module 130*a*-*e*, a corresponding set 122*a*-*e* of patches of the block input 112 that are to be routed to the expert module 130*a*-*e* for processing. Each expert module 130*a*-*e* then processes the assigned set 122*a*-*e* of patches to generate a corresponding set 132*a*-*e* of expert module outputs, i.e., a respective expert module output for each assigned patch. Expert module outputs can also be called simply “module outputs.”

To assign the patches to respective expert modules 130*a*-*e*, the routing module 120 can process each patch using a routing neural network that includes one or more neural network layers. In response to processing a particular patch, the routing neural network can generate an output that includes a respective routing score for each expert module 130*a*-*e* of the $j^{th}$ network block 110*j*. The routing module 120 can determine to assign a patch to one or more expert modules 130*a*-*e* corresponding to the highest routing scores for the patch.

In some implementations, each patch is assigned to the same number of expert modules 130*a*-*e*. That is, each patch can be assigned to the k expert modules 130*a*-*e* that have the highest routing scores for the patch, where k is the same for all patches.

In some other implementations, some patches can be assigned to a different number of expert modules. For example, a patch can be assigned to an expert module 130*a*-*e* if the routing score for the expert module 130*a*-*e* and the patch satisfies a predetermined threshold. As another example, each expert module 130*a*-*e* can be ensured to process exactly p patches, p≥1, by assigning the p patches that have the highest routing score corresponding to the expert module, out of all the routing scores corresponding to the expert module and respective patches.

In some implementations, not every expert module 130*a*-*e* of the $j^{th}$ network block 110*j* processes a patch of the block input 112; that is, for some input images 102, some expert modules 130*a*-*e* of the $j^{th}$ network block 110*j* are idle for the block input 112 generated from the input image 102. Allowing some expert modules 130*a*-*e* to be idle during some executions of the neural network 100 can improve the efficiency of the neural network 100 by reducing the number of computations required to generate a network output 108, as not every parameter of the neural network 100 is used to process each input image 102.

The routing neural network of the routing module 120 can be configured through training to assign each patch to the expert modules 130*a*-*e* that will extract the most information from the patch. That is, in some implementations, at least some of the expert modules 130*a*-*e* can “specialize” in certain types of patches, e.g., patches that depict a particular semantic object or a category of semantic objects. Example techniques for training the neural network 100 are discussed in more detail below.

In some implementations, the $j^{th}$ network block 110*j* limits the number of patches that each expert module 130*a*-*e* can process, so that no one expert module 130*a*-*e* can be assigned a disproportionate amount of work (i.e., computations) relative to the other expert modules and thus become a bottleneck for the execution of the neural network 100. For example, the network block 110*j* can limit the number of patches that can be assigned to any expert module 130*a*-*e* to be fewer than or equal to:

$$P_e = C\frac{KBP}{E}$$

where B is the number of images in a batch of input images 102 that are being processed by the neural network 100 (e.g., a batch of images 102 that are provided to the neural network 100 at inference time and processed by the neural network 100 in parallel), K is the number of expert modules 130*a*-*e* to which each patch is assigned, P is the number of patches in the block input 112, and E is the number of expert modules 130*a-e* in the network block 110*j*. C can be a hyperparameter of the neural network 100 that represents a capacity of each expert module 130*a-e*, where C=1 indicates that each expert module 130*a-e* is only permitted to process 1/E of the patches during a given execution of the neural network 100.

In some implementations, the neural network 100 sets C<<1, e.g., C=0.5, 0.1, 0.05, or 0.01.

In some implementations, if more image patches are assigned to an expert module 130*a-e* than allowed, then the patches that exceed the limit (e.g., the patches assigned to the expert module 130*a-e* that have the lowest routing score corresponding to the expert module 130*a-e*) are reassigned, e.g., to the expert module 130*a-e*, for each patch, with the next-highest routing score. In some other implementations, the patches that exceed the limit are not reassigned but rather "dropped" so that the patch is processed by one fewer expert module 130*a-e* than the others; this is equivalent to processing the dropped patches using an expert module that is simply the identity function.

In some implementations, the neural network 100 operates with a different value for C during different executions of the neural network 100; that is, the value for C can be changed after the neural network 100 has been trained. For example, during training of the neural network 100, the value for C can be relatively high so that relatively few patches are dropped and a training system can use the module outputs of the expert modules 130*a-e* to determine updates to the network parameters of the neural network layers of the expert modules 130*a-e*. Then, at inference time, the value for C can be lowered to improve the time and computational efficiency of the neural network 100. As a particular example, the neural network 100 can be deployed in an inference environment with scarce resources, e.g., on a device such as a mobile phone or tablet that has relatively few computational resources, or in an environment in which the neural network 100 continuously receives new images 102 and must generate corresponding network outputs 108 using a fixed time budget.

In some implementations, for each patch of the block input 112, the routing module 120 randomly samples a noise value (e.g., from a Normal distribution) for each expert module 130*a-e* and adds the sampled noise value to the corresponding routing score before determining the k highest routing scores for the patch. For example, the routing module 120 can add noise values during the training of the neural network 100 to encourage variety and thus encourage each expert module 130*a-e* to receive parameter updates. At inference time, the routing module 120 can be configured not to add noise values, because the routing module 120 has been trained to assign high-quality routing scores.

In some implementations, the network block can apply a nonlinear activation function, e.g., a softmax, Tanh, or ReLU function, to the routing scores before determining the k highest routing scores.

The routing neural network can include any appropriate configuration of neural network layers.

For example, the routing neural network can include one or more feedforward neural network layers. As a particular example, if a patch has dimensionality L×W×C, then the routing module 120 can reshape the patch to have dimensionality 1×(L·W·C) and process the reshaped patch using the feedforward neural network layers.

Instead or in addition, the routing neural network can include one or more convolutional neural network layers. As a particular example, if a patch has dimensionality $L_1 \times W_1 \times C$, then the routing neural network can perform two-dimensional convolution on the patch using a convolutional kernel having dimensionality $L_2 \times W_2 \times C$, where $L_1 > L_2$ and $W_1 > W_2$.

Instead or in addition, the routing neural network can include one or more self-attention layers. Self-attention is discussed in more detail below with reference to FIG. 1B.

In some implementations, the operations of the e expert modules 130*a-e* are executed in parallel, thus improving the time efficiency of the neural network 100.

In some implementations, each expert module 130*a-e* is executed on the same processing device, e.g., on parallel processing hardware that is configured to execute at least some of the expert modules 130*a-e* on respective different threads, e.g., a graphics processing unit (GPU) or tensor processing unit (TPU). In some other implementations, respective expert module 130*a-e* can be executed by different processing devices, e.g., by a distributed system of multiple different parallel processing devices. Executing at least some of the expert modules 130*a-e* in parallel can significantly reduce the latency of the execution of the neural network 100, e.g., by approximately a factor of e if all expert modules 130*a-e* are executed on different devices. Thus, for a given number of network parameters, a neural network that includes at least one expert network block of expert modules can enjoy reduced latency relative to a neural network with only dense neural network layers both because (i) each element of the input image is processed by a strict subset of the network parameters of the expert modules and because (ii) the execution of the expert modules can be parallelized while, in some implementations, a dense neural network layer cannot be parallelized. Equivalently, for the same reasons, given a particular time budget (i.e., for a particular latency threshold), a neural network that includes at least one expert network block of expert modules can include significantly more network parameters, and thus increased network capacity (i.e., the ability to encode more information) relative to a neural network with only dense neural network layers.

In some implementations in which the expert modules 130*a-e* are distributed across multiple devices, the processing device executing the routing module 120 is configured to provide, to the processing device executing a particular expert module 130*a-e*, only the set of patches 122*a-e* that have been assigned to the particular expert module 130*a-e*. In some other such implementations, the processing device executing the routing module 120 is configured to provide, to the processing device executing the particular expert module 130*a-e*, the entire block input 112 along with data identifying which patches of the block input 112 are to be processed by the particular expert module 130*a-e*.

After each patch is processed by the corresponding one or more expert modules to generate respective module outputs, the combination module 140 of the network block 110*j* can combine the module outputs corresponding to each patch to generate the block output 114 for the network block 110*j*. In particular, the combination module 140 can combine, for each patch of the block input 112, the corresponding module outputs generated by respective expert modules 130*a-e* in response to processing the patch to generate a patch output for the patch. The combination module 140 can then recompose the patch outputs to generate the block output 114 such that the patch outputs have the same spatial relationships with each other in the block output 114 as the corresponding patches had in the block input 112.

For example, in some implementations the patch outputs have the same dimensionality as the corresponding patches.

Thus, the combination module can compose the patch outputs to generate a block output 114 that has the same dimensionality L×W×C as the block input 112, where each patch output occupies the same position in the block output 114 as the corresponding patch occupied in the block input 112.

In some implementations, the combination module 140 combines, for each patch of the block input, the corresponding module outputs by computing a sum of the module outputs for the patch. In some such implementations, to generate the patch output for each patch, the combination module 140 can weight each module output using the routing score corresponding to the patch and the expert module 130*a-e* that generated the module output. In some other implementations, the combination module 140 combines the module outputs of the expert modules 130*a-e* by processing the module outputs using one or more neural network layers, e.g., one or more self-attention layers or one or more recurrent neural network layers.

In some implementations, before assigning patches of the block input 102 to respective expert modules 130*a-e*, the network block 110*j* first processes the block input using one or more neural network layers to generate an updated representation of the block input 102 and then assigns patches of the updated representation of the block input 102 to respective expert modules 130*a-e*. For example, the network block 110*j* can first process the block input using one or more self-attention neural network layers and/or one or more element-wise feedforward neural network layers that are configured to process each patch of the block input 102. In other words, the input to the expert modules can be a strict subset of the elements of an updated representation of the block input 102, rather than of the block input 102 itself. Generally, in this specification we refer to patches of a block input 102, but it is to be understood that the same procedure can be applied to patches of an updated representation of the block input 102. Equivalently, the one or more neural network layers preceding the routing module 120 can be considered to be a part of a different network block in the sequence of network blocks 110*a-l*.

The block output 114 of the $j^{th}$ network block 110*j* can be provided as the block input to the subsequent network block in the sequence of network blocks 110*a-l*.

As described above, in some implementations the block output of the final network block 110*l* in the sequence is the network output 108. For example, if the block output of the final network block 110*l* includes a respective representation for each of multiple patches of the input image 102, then the network output 108 can include the representation for each patch. As another example, the network output 108 can include a combined representation generated from the representations of each patch, e.g., a combined representation generated by determining a mean of the representations of the patches, or by applying a pooling operation (e.g., average pooling, max pooling, or global pooling).

As another example, as described above, in some implementations the neural network 100 processes a predetermined class token along with the input image 102, such that each network block in the sequence of network blocks generates an updated representation for the predetermined class token in addition to the updated representations of the patches. In these implementations, the network output 108 can be the final representation of the predetermined class token generated by the final network block 110*l*.

The neural network 100 can be trained using any appropriate technique. For example, a training system can process training images using the neural network 100 to generate respective training outputs, and determine an error of the training outputs, e.g., using ground-truth outputs corresponding to the training images. The training system can then backpropagate the error through the neural network 100 and determine an update to the parameters of the neural network 100 using gradient descent.

Instead or in addition, the training system can train the neural network 100 using an "importance loss" that encourages, for each expert network block in the sequence of network blocks 110*a*-1, the routing scores corresponding to each expert module 130*a-e* in the expert network block to have the same mean. For example, for each expert module i, the training system can compute:

$$imp_i(X) = \sum_{x \in X} f_i(x)$$

where $f_i$ is a function defined by the routing neural network of the routing module 120 of the expert network block for computing the routing score for the expert module i or an intermediate routing score for the expert module i. For example, $f_i(x)$ can be the routing score for expert module i and patch x before random noise is added and before a nonlinear activation function is applied. The training system can then compute an importance loss $\mathcal{L}_{imp}(X)$ to encourage, for each expert module i, $imp_i(X)$ to have the same mean. As a particular example, the training system can compute:

$$\mathcal{L}_{imp}(X) = \left( \frac{std(imp_{1:E}(X))}{\text{mean}(imp_{1:E}(X))} \right)^2$$

where E is the number of expert modules.

Instead or in addition, the training system can train the neural network 100 using a "load loss" that encourages, for each expert network block and for each patch, the likelihood that each expert module 130*a-e* of the expert network block is assigned the patch to have the same mean. For example, for each expert module i and for each image x, the training system can compute:

$$\text{threshold}_k(x) = \max_{(k)} g_i(x)$$

where $g_i(x)$ is a function defined by the routing neural network of the routing module 120 of the expert network block for computing the routing score for the expert module i or an intermediate routing score for the expert module i. For example, $g_i(x)$ can be the routing score for expert module i and patch x after random noise is added but before a nonlinear activation function is applied. The training system can then compute, for each training image x and for each expert module i:

$$p_i(x) = P(g_i(x) \geq \text{threshold}_k(x))$$

where P(e) is a likelihood of event e occurring. Given the distribution of the random noise, $p_i(x)$ is directly computable. Then, for each expert module i, the training system can compute:

$$\text{load}_i(X) = \sum_{x \in X} p_i(x)$$

and compute the load loss $\mathcal{L}_{load}(X)$ to encourage, for each expert module i, $\text{load}_i(x)$ to have the same mean. As a particular example, the training system can compute:

$$\mathcal{L}_{load}(X) = \left( \frac{std(\text{load}_{1:E}(X))}{\text{mean}(\text{load}_{1:E}(X))} \right)^2$$

where E is the number of expert modules.

In some implementations, the neural network 100 can be pre-trained using a first machine learning task to generate initial values for the network parameters of the neural network 100. The initial values can then be fine-tuned (i.e., updated) using a second machine learning task, e.g., concurrently with one or more head neural networks each configured to process the network output 108 to generate a final prediction for a respective second machine learning task. For example, a training system can pre-train the neural network 100 in an unsupervised or self-supervised manner using unlabeled images, e.g., to train the neural network 100 to segment the unlabeled images into different classes based on their similarity or to train the neural network 100 to perform unsupervised semantic segmentation of the unlabeled images. The training system can then fine-tune the network parameters of the neural network 100 (e.g., along with a new untrained head neural network) in a supervised manner using a task-specific data set of labeled images to perform a particular task, e.g., object recognition, pose detection, face recognition, optical flow tracking, or any other appropriate machine learning task.

The image 102 can be any appropriate type of image. For example, the image 102 can be a two-dimensional image, e.g., a two-dimensional image that has multiple channels (e.g., an RGB image). As another example, the image 102 can be a hyperspectral image that represents a continuous spectrum of wavelengths, e.g., by identifying, for each pixel in the image 102, a distribution over the spectrum. As another example, the image 102 can be a point cloud that includes multiple points, where each point has a respective coordinate, e.g., in a three-dimensional or a higher-dimensional coordinate space; as a particular example, the image 102 can be a point cloud generated by a LIDAR sensor. As another example, the image 102 can be a medical image generating by a medical imaging device; as particular examples, the image 102 can be a computer tomography (CT) image, a magnetic resonance imaging (MRI) image, an ultrasound image, an X-ray image, a mammogram image, a fluoroscopy image, or a positron-emission tomography (PET) image.

Although the below description refers to generating image patches of the image 102 that each include respective "pixels" of the image 102, it is to be understood that the neural network system 101 can generate image patches that include components of the image 102 that are of any appropriate type. For example, if the image 102 is a point cloud, then each image patch of the image 102 can include a subset of the points in the point cloud. As another example, if the image 102 is an MRI image that includes multiple voxels in a three-dimensional voxel grid, then each image patch of the image 102 can include a subset of the voxels in the voxel grid.

The neural network can be configured to process the images to perform any appropriate image processing task, e.g., a classification task, a regression task, or a combination thereof.

As a particular example, the neural network 100 can be configured to generate a classification output that includes a respective score corresponding to each of multiple categories. The score for a category indicates a likelihood that the image belongs to the category. In some cases, the categories may be classes of objects (e.g., dog, cat, person, and the like), and the image may belong to a category if it depicts an object included in the object class corresponding to the category. In some cases, the categories may represent global image properties (e.g., whether the image depicts a scene in the day or at night, or whether the image depicts a scene in the summer or the winter), and the image may belong to the category if it has the global property corresponding to the category.

As another particular example, the neural network 100 can be configured to generate an element-level classification output (e.g., a pixel-level classification output for an RGB image or a point-level classification output for a LIDAR image) that includes, for each element in the image, a respective score corresponding to each of multiple categories. For a given element (e.g., for a given pixel or point), the score for a category indicates a likelihood that element belongs to the category. In some cases, the categories may be classes of objects, and an element may belong to a category if it is part on an object included in the object class corresponding to the category. That is, the element-level classification output may be semantic segmentation output.

As another particular example, the neural network 100 can be configured to generate a regression output that estimates one or more continuous variables (i.e., that can assume infinitely many possible numerical values) that characterize the image. In a particular example, the regression output may estimate the coordinates of bounding boxes that enclose respective objects depicted in the image. The coordinates of a bounding box may be defined by (x, y) coordinates of the vertices of the bounding box.

In some implementations, the neural network 100 can be configured to process multiple images, e.g., multiple frames of a video. For example, the neural network can receive multiple images that are video frames of a video, and can process each video frame as described above to generate an output that characterizes the video frames, e.g., by characterizing whether the video frames depict a person performing a particular action.

In some such implementations, the neural network 100 processes each video frame at respective different time points to generate a respective network output for each video frame that characterizes a prediction for the video frame. For example, the neural network can generate a network output that predicts a classification of the video frame. In some such implementations, the neural network combines the multiple network outputs corresponding to respective video frames to generate a final network output that characterizes the video. For example, the neural network can process the respective network outputs using a downstream neural network, e.g., a recurrent neural network.

In some other implementations, the neural network 100 processes each video frame in parallel to generate a single network output that characterizes the video. As a particular example, the system can generate one or more respective input elements in the input sequence for each video frame.

Figure 1B:
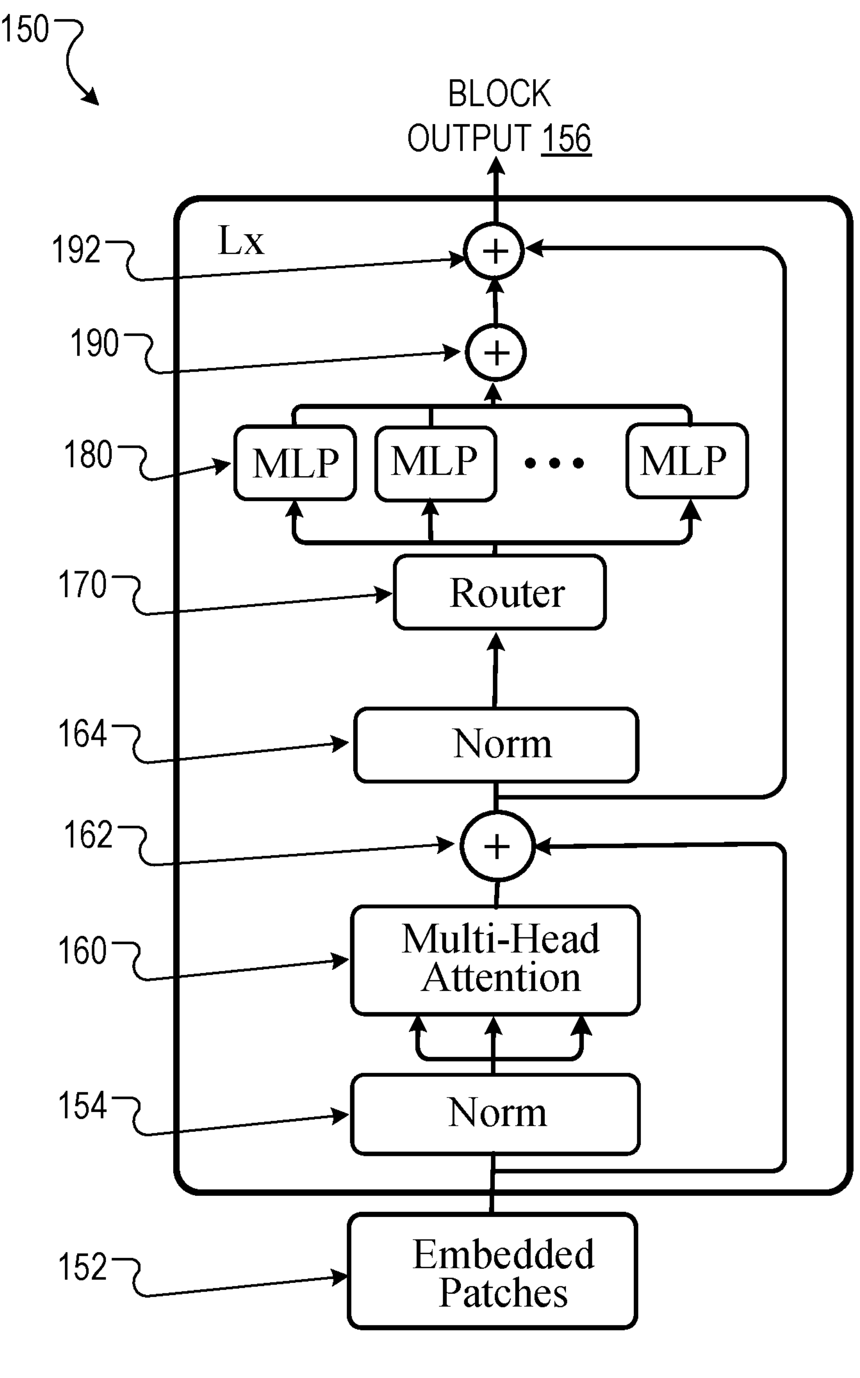
FIG. 1B is a diagram of an example neural network block that includes multiple expert modules.

FIG. 1B is a diagram of an example neural network block 150 that includes multiple expert modules 180. The neural network 150 is an example of a system implemented as computer programs on one or more computers in one or more locations, in which the systems, components, and techniques described below can be implemented.

The network block 150 can be one of a sequence of L network blocks, L≥1, of a neural network configured to process an input image to generate a network output characterizing the input image, e.g., a network output representing an embedding of the input image or representing a prediction about the input image. For example, the network block 150 can be one of the network blocks in the sequence of network blocks 110*a-l* described above with reference to FIG. 1A.

The network block 150 is configured to process a set of embedded patches 152 of the input image, i.e., updated representations of patches determined from the input image that have been generated by one or more preceding network blocks in the sequence of network blocks, to generate a block output 156. If the network block 150 is the first network block in the sequence, then the network block 150 can be configured to process the original patches determined from the input image.

The network block 150 includes one or more self-attention neural network layers. As depicted in FIG. 1B, the network block 150 includes a single self-attention neural network layer 160. In some implementations, the self-attention neural network layer 160 is configured to obtain the embedded patches 152 and apply an attention mechanism over the embedded patches 152. In some other implementations, the self-attention neural network layer 160 is configured to obtain respective processed versions of the embedded patches 152 and apply the attention mechanism over the processed embedded patches 152. For example, as depicted in FIG. 1B, the network block 150 can first apply a layer normalization layer 154 to the embedded patches 152 before providing the output of the layer normalization layer 154 to the self-attention neural network layer 160. Instead or in addition, the network block 150 can apply one or more other neural network layers to the embedded patches 152 before the self-attention neural network layer 160, e.g., one or more element-wise feedforward neural network layers.

For example, the network block 150 can generate, for each embedded patch 152, a one-dimensional tensor that includes the elements of the embedded patch 152. If each embedded patch 152 has dimensionality $L_1 \times W_1 \times C$, then the network block 150 can generate a one-dimensional tensor that has dimensionality $1 \times (L \cdot W \cdot C)$. The network block 150 can then generate an input sequence from the one-dimensional tensors, where at least some of the input positions of the input sequence are the one-dimensional tensors, and process the input sequence using the self-attention neural network layer 160.

In particular, for the respective embedded patch 152 (or processed version thereof) corresponding to each particular input position, the self-attention neural network layer 160 is configured to apply an attention mechanism over the embedded patches 152 at the input positions (i.e., the other embedded patches 152 and, in some implementations, itself) using one or more queries derived from the embedded patch 152 at the particular input position to generate a respective output for the particular position. The output of the self-attention neural network layer 160 is an output sequence that includes a respective output element corresponding to each input position.

In some implementations, some or all of the self-attention neural network layers in the network block 150 (e.g., the self-attention neural network layer 160 depicted in FIG. 1B) are multi-head self-attention neural network layers. A multi-head self-attention neural network layer applies h different attention mechanisms in parallel to generate respective sequences of output elements, and then combines the multiple sequences of output elements to generate a final sequence of output elements.

In some implementations, some or all of the self-attention neural network layers in the network block 150 (e.g., the self-attention neural network layer 160 depicted in FIG. 1B) incorporate positional information of the respective embedded patches 152 in the input sequence into the attention mechanism. For example, when applying attention with respect to a particular embedded patch 152 (i.e., when generating the respective output element corresponding to the particular embedded patch 152), the self-attention neural network layer 160 can identify an attention positional embedding representing the position of the embedded patch 152 corresponding the image (or within the block input).

In this specification, an embedding is an ordered collection of numeric values that represents an input in a particular embedding space. For example, an embedding can be a vector of floating point or other numeric values that has a fixed dimensionality.

In some implementations, the network block 150 includes a residual connection layer 162 that combines the outputs of a self-attention neural network layer 160 with the inputs to the self-attention neural network layer 160. Instead or in addition, the network block 150 can include a layer normalization layer 164 that applies layer normalization to the output of the self-attention neural network layer 160 (or the residual connection layer 162).

The output of the self-attention neural network layer 160 (or the residual connection layer 162 or the layer normalization layer 164) includes an updated representation of the embedded patches 152. The updated representations of the embedded patches 152 can be provided to a routing module 170 that is configured to assign, for each updated representation of a respective embedded patch 152, the updated representation to one or more expert modules 180 of a set of multiple expert modules of the network block 150. The routing module 170 can be configured similarly to the routing module 120 described above with reference to FIG. 1B.

The network block can provide, for each expert module 180, the assigned updated representations of respective embedded patches 152 for processes to generate a respective expert module output for each assigned updated representation. The expert modules 180 can be configured similarly to the expert modules 130*a-e* described above with reference to FIG. 1A.

As depicted in FIG. 1B, each expert module 180 is a multi-layer perceptron (MLP) that includes one or more feedforward neural network layers. For example, the expert modules 180 can include two or more learned linear transformations each separated by an activation function, e.g., a non-linear elementwise activation function, e.g., a ReLU activation function.

The expert module outputs can then be combined by a combination module 190 of the network block 150 to generate the block output 156 for the network block. The combination module 190 can be configured similarly to the combination module 140 described above with reference to FIG. 1A.

In some implementations, the network block 150 includes a residual connection layer 192 that combines the outputs of the combination module 190 with the inputs to the routing module 170. That is, the block output 156 can be the output of the residual connection layer 192 rather than the combination module 190.

The block output 156 can be provided to one or more subsequent network block in the sequence of network blocks for further processing to generate a network output for the neural network.

After generating the network output, the neural network can provide the network output 108 to one or more downstream systems. For example, the neural network can provide the network output to one or more head neural networks to generate predictions for respective machine learning tasks, as described above with reference to FIG. 1A. As another example, the neural network can provide the network output, which can represent an embedding of the input image, to a database or to one or more downstream machine learning models for further processing.

Figure 2:
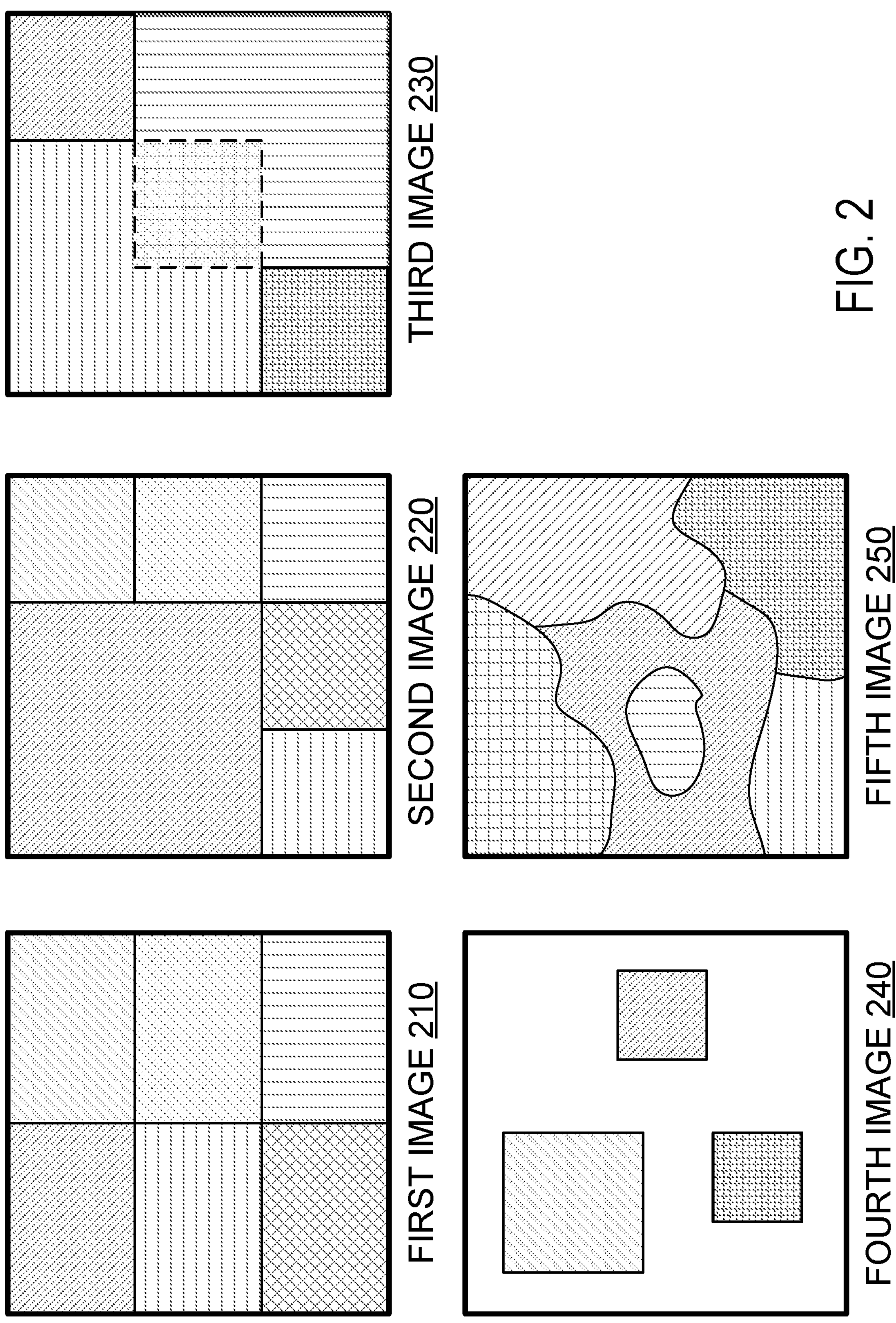
FIG. 2 illustrates example images segmented into image patches.

FIG. 2 illustrates example images 210, 220, 230, 240, and 250 segmented into image patches.

The images 210-250 can be provided as input to a neural network system, e.g., the neural network 101 described above with reference to FIG. 1A, that is configured to process the images 210-250 to generate a prediction about the images 210-250. The neural network system can be configured to segment the images 210-250 into multiple image patches, and process the image patches using a sequence of network blocks that includes one or more expert network blocks.

Although the below description refers to determining patches of images, it is to be understood that the same techniques can be used to determine patches of intermediate representations of images, e.g., patches of block inputs to the network blocks such as the block input 112 described above with reference to FIG. 1A.

The images 210, 220, 230, 240, and 250 depict different possibilities for segmenting images into image patches. In particular, in FIG. 2, each image 210-250 is depicted as segmented into a set of multiple image patches that are each visually distinct, i.e., using different shading or hatching. Generally, a neural network system would be configured to segment all received images according to the same schema. That is, the same neural network system would not necessarily segment each of the images 210, 220, 230, 240, and 250 as depicted, because the images have been segmented according to different schema.

As depicted in the first image 210, in some implementations, the neural network system can generate image patches that each have the same size and shape, e.g., each image patch can be a rectangle. Furthermore, in some implementations, the neural network system can segment the first image 210 such that every pixel is a member of exactly one image patch. As a particular example, as depicted in FIG. 2, the image patches can represent a grid of same-sized rectangles. As another particular example, the image patches can represent a grid of same-sized hexagons.

As depicted in the second image 220, in some implementations, the neural network system can generate image patches that have different sizes.

As depicted in the third image 230, in some implementations, the neural network system can segment the third image 230 such that some pixels are members of multiple different image patches. For example, a first image patch can include a strict superset of the pixels of a second image patch; that is, the second image patch can be entirely enclosed within the first image patch. As a particular example, for each of multiple first image patches determined from an image (e.g., for each first image patch in a grid of first image patches), the neural network system can generate a respective second image patch that has the same center pixel but a different size and/or aspect ratio.

As depicted in the fourth image 240, in some implementations, the neural network system can segment the fourth image 240 such that some pixels are not members of any image patch. For example, the neural network system can process the fourth image 240 using a machine learning model to identify one or more regions of interest, and the neural network system can generate a respective patch for each identified region of interest. For example, the machine learning model can be configured to identify one or more pixels, and the neural network system can generate a respective patch centered at each identified pixel.

As depicted in the fifth image 250, in some implementations, the neural network system can generate image patches of arbitrary shape. That is, the image patches are not required to be rectangular. For example, the neural network system can process the fifth image 250 using a machine learning model that is configured to segment the fifth image 250, e.g., by assigning each pixel in the fifth image 250 a respective class. The neural network system can then generate a respective patch for each contiguous set of pixels that have been assigned the same class by the machine learning model.

Although the images 210-250 are depicted in FIG. 2 as two-dimensional images (or images that are two-dimensional with multiple channels, e.g., RGB images), generally the neural network system can be configured to generate predictions for any type of image, as described above with reference to FIG. 1A.

Figure 3:
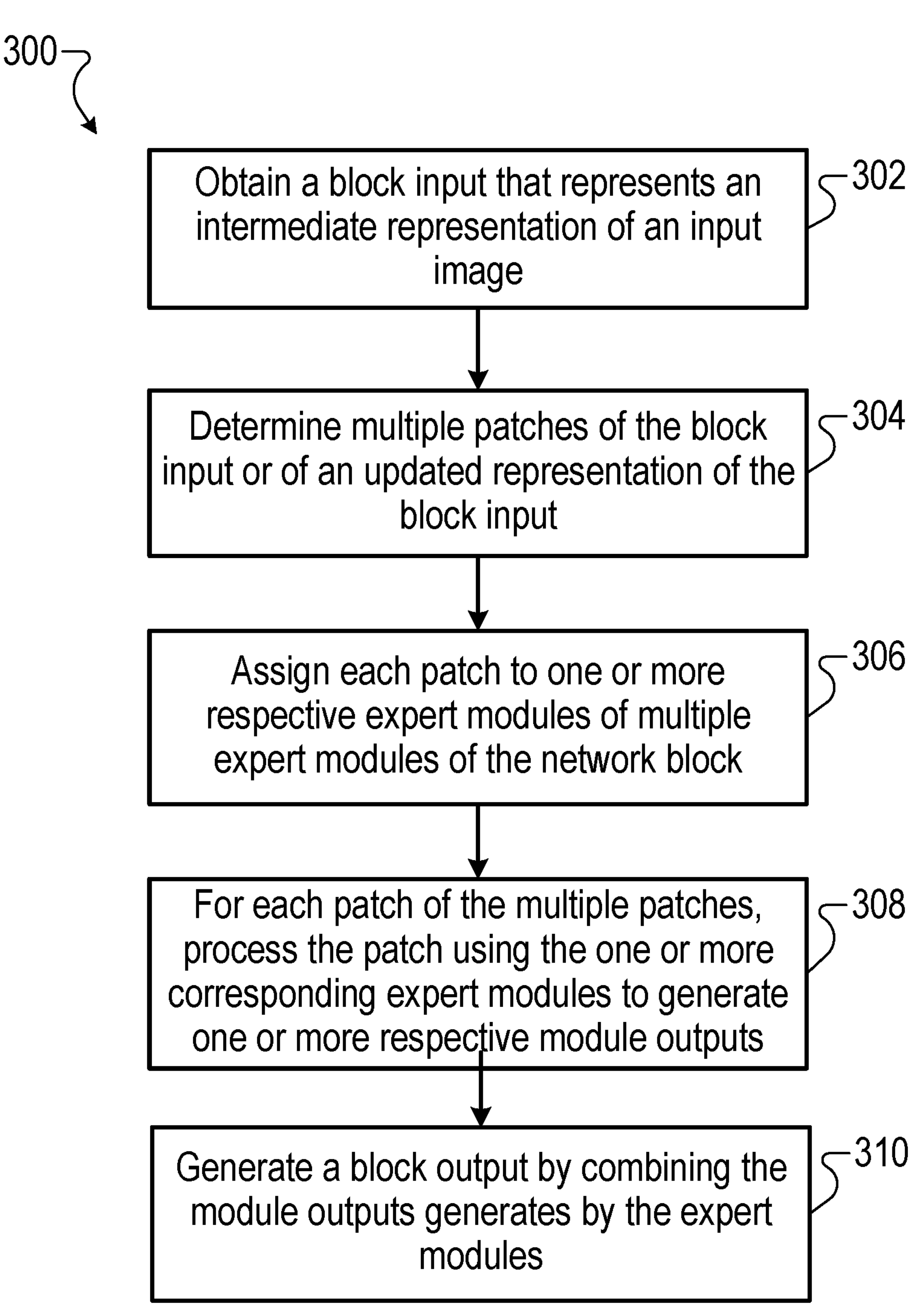
FIG. 3 is a flow diagram of an example process for executing a network block that includes multiple expert modules.

FIG. 3 is a flow diagram of an example process for executing a network block that includes multiple expert modules. For convenience, the process 300 will be described as being performed by a system of one or more computers located in one or more locations. For example, a neural network system, e.g., the neural network 100 described above with reference to in FIG. 1A, appropriately programmed in accordance with this specification, can perform the process 300.

The network block can be one network block in a sequence of network blocks of a neural network that is configured to process an input image and to generate a network output for the input image.

The system obtains a block input that represents an intermediate representation of the input image (step 302).

The system determines a set of multiple patches of the block input (or of an updated representation of the block input, e.g., an updated representation generated by applying a self-attention mechanism as described above with reference to FIG. 1B), wherein each patch comprises a different subset of elements of the block input (or of the updated representation of the block input) (step 304).

The system assigns each patch to one or more respective expert modules of a plurality of expert modules of the network block (step 306).

The system processes, for each patch of the plurality of patches, the patch using the one or more corresponding expert modules to generate one or more respective module outputs (step 308).

The system generates a block output for the network block by combining the module outputs generated by the respective expert modules (step 310).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a system comprising a neural network that is configured to process an input image and to generate a network output for the input image, the neural network comprising a sequence of one or more network blocks that are each configured to perform operations comprising:

obtaining a block input that represents an intermediate representation of the input image;

determining a plurality of patches of the block input or of an updated representation of the block input, wherein each patch comprises a different subset of elements of the block input or of the updated representation of the block input;

assigning each patch to one or more respective expert modules of a plurality of expert modules of the network block;

for each patch of the plurality of patches, processing the patch using the one or more corresponding expert modules to generate one or more respective module outputs; and generating a block output by combining the module outputs generated by the respective expert modules.

Embodiment 2 is the system of embodiment 1, wherein assigning each patch to one or more respective experts module of the network block comprises:

processing the patch using a routing subnetwork to generate, for each expert module of the plurality of expert modules, a respective routing score;

determining one or more highest routing scores of the plurality of routing scores; and assigning the patch to the expert module corresponding to each of the one or more highest routing scores.

Embodiment 3 is the system of embodiment 2, wherein processing the patch using a routing subnetwork to generate, for each expert module of the plurality of expert modules, a respective routing score comprises:

processing the patch using one or more feedforward neural network layers to generate a respective first intermediate routing score for each expert module;

sampling, for each expert module, a noise value and adding the noise value to the first intermediate routing score of the expert module to generate a second intermediate routing score for the expert module;

applying, for each expert module, a non-linear activation function to the second intermediate routing score of the expert module to generate the routing score for the expert module.

Embodiment 4 is the system of any one of embodiments 2 or 3, wherein, for each patch of the plurality of patches, processing the patch using the one or more corresponding expert modules to generate one or more respective module outputs comprises:

processing, for each of the one or more expert modules corresponding to the patch, the patch using the expert module to generate a respective initial module output; and scaling, for each of the one or more expert modules corresponding to the patch, the corresponding initial module output according to the routing score corresponding to the expert module and the patch.

Embodiment 5 is the system of any one of embodiments 2-4, wherein the neural network has been trained using one or more of:

an importance loss that encourages the routing scores corresponding to each expert module to have a same measure of central tendency, or a load loss that encourages respective likelihoods that each expert module is assigned a patch to have a same measure of central tendency.

Embodiment 6 is the system of embodiment 5, wherein determining the importance loss $\mathcal{L}_{imp}(X)$ for a batch of training images X comprises:

for each expert module i, computing:

$$imp_i(X) = \sum_{x \in X} f_i(x)$$

wherein $f_i$ is a function defined by the routing subnetwork for computing the routing score for the expert module i or an intermediate routing score for the expert module i; and computing the importance loss $\mathcal{L}_{imp}(X)$ to encourage, for each expert module i, $imp_i(X)$ to have a same measure of central tendency.

Embodiment 7 is the system of embodiment 6, wherein the importance loss $\mathcal{L}_{imp}(X)$ is:

$$\mathcal{L}_{imp}(X) = \left( \frac{std(imp_{1:E}(X))}{\text{mean}(imp_{1:E}(X))} \right)^2$$

wherein E is a number of the plurality of expert modules.

Embodiment 8 is the system of any one of embodiments 5-7, wherein:

each patch is assigned to k different expert modules, k≥1, and determining the load loss $\mathcal{L}_{load}(X)$ for a batch of training images X comprises:

for each training image x in the batch of training images X, computing:

$$\text{threshold}_k(x) = \max_{(k)} g_i(x)$$

wherein $g_i(x)$ is a function defined by the routing subnetwork for computing the routing score for the expert module i or an intermediate routing score for the expert module i;

for each training image x and for each expert module i, computing:

$$p_i(x) = P(g_i(x) \geq \text{threshold}_k(x))$$

wherein P(e) is a likelihood of event e occurring; and for each expert module i, computing:

$$\text{load}_i(X) = \sum_{x \in X} p_i(x)$$

and computing the load loss $\mathcal{L}_{load}(X)$ to encourage, for each expert module i, $\text{load}_i(x)$ to have a same measure of central tendency.

Embodiment 9 is the system of embodiment 8, wherein the load loss $\mathcal{L}_{load}(X)$ is:

$$\mathcal{L}_{load}(X) = \left( \frac{std(\text{load}_{1:E}(X))}{\text{mean}(\text{load}_{1:E}(X))} \right)^2$$

wherein E is a number of the plurality of expert modules.

Embodiment 10 is the system of any one of embodiments 1-9, wherein processing, for each patch of the plurality of patches, the patch using the corresponding expert module comprises processing the patches in parallel across the expert modules.

Embodiment 11 is the system of any one of embodiments 1-10, wherein a number of the plurality of expert modules is greater than a number of the plurality of patches.

Embodiment 12 is a method comprising the operations of any one of embodiments 1-11.

Embodiment 13 is one or more computer storage media storing instructions that when executed by one or more computers cause the one more computers to perform the operations of any one of embodiments 1-11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising a neural network that is configured to process an input image and to generate a network output for the input image, the neural network comprising a sequence of one or more network blocks that are each configured to perform operations comprising:

obtaining a block input that represents an intermediate representation of the input image;

determining a plurality of patches of the block input or of an updated representation of the block input, wherein each patch comprises a different subset of elements of the block input or of the updated representation of the block input;

assigning each patch to one or more respective expert modules of a plurality of expert modules of the network block;

for each patch of the plurality of patches, processing the patch using the one or more corresponding expert modules to generate one or more respective module outputs; and generating a block output that is an updated representation of the input image and that has a same dimensionality as the block input by combining the module outputs generated by the respective expert modules.

2. The system of claim 1, wherein assigning each patch to one or more respective experts module of the network block comprises:

processing the patch using a routing subnetwork to generate, for each expert module of the plurality of expert modules, a respective routing score;

determining one or more highest routing scores of the plurality of routing scores; and assigning the patch to the expert module corresponding to each of the one or more highest routing scores.

3. The system of claim 2, wherein processing the patch using a routing subnetwork to generate, for each expert module of the plurality of expert modules, a respective routing score comprises:

processing the patch using one or more feedforward neural network layers to generate a respective first intermediate routing score for each expert module;

sampling, for each expert module, a noise value and adding the noise value to the first intermediate routing score of the expert module to generate a second intermediate routing score for the expert module;

applying, for each expert module, a non-linear activation function to the second intermediate routing score of the expert module to generate the routing score for the expert module.

4. The system of claim 2, wherein, for each patch of the plurality of patches, processing the patch using the one or more corresponding expert modules to generate one or more respective module outputs comprises:

processing, for each of the one or more expert modules corresponding to the patch, the patch using the expert module to generate a respective initial module output; and scaling, for each of the one or more expert modules corresponding to the patch, the corresponding initial module output according to the routing score corresponding to the expert module and the patch.

5. The system of claim 2, wherein the neural network has been trained using one or more of:

an importance loss that encourages the routing scores corresponding to each expert module to have a same measure of central tendency, or a load loss that encourages respective likelihoods that each expert module is assigned a patch to have a same measure of central tendency.

6. The system of claim 5, wherein determining the importance loss $\mathcal{L}_{imp}(X)$ for a batch of training images X comprises:

for each expert module i, computing:

$$imp_i(X) = \sum_{x \in X} f_i(x)$$

wherein $f_i$ is a function defined by the routing subnetwork for computing the routing score for the expert module i or an intermediate routing score for the expert module i; and computing the importance loss $\mathcal{L}_{imp}(X)$ to encourage, for each expert module i, $imp_i(X)$ to have a same measure of central tendency.

7. The system of claim 6, wherein the importance loss $\mathcal{L}_{imp}(X)$ is:

$$\mathcal{L}_{imp}(X) = \left(\frac{std(imp_{1:E}(X))}{\text{mean}(imp_{1:E}(X))}\right)^2$$

wherein E is a number of the plurality of expert modules.

8. The system of claim 5, wherein:

each patch is assigned to k different expert modules, k≥1, and determining the load loss $\mathcal{L}_{load}(X)$ for a batch of training images X comprises:

for each training image x in the batch of training images X, computing:

$$\text{threshold}_k(x) = \max_{(k)} g_i(x)$$

wherein $g_i(x)$ is a function defined by the routing subnetwork for computing the routing score for the expert module i or an intermediate routing score for the expert module i;

for each training image x and for each expert module i, computing:

$$p_i(x) = P(g_i(x) \geq \text{threshold}_k(x))$$

wherein P(e) is a likelihood of event e occurring; and for each expert module i, computing:

$$\text{load}_i(X) = \sum_{x \in X} p_i(x)$$

and computing the load loss $\mathcal{L}_{load}(X)$ to encourage, for each expert module i, $\text{load}_i(x)$ to have a same measure of central tendency.

9. The system of claim 8, wherein the load loss $\mathcal{L}_{load}(X)$ is:

$$\mathcal{L}_{load}(X) = \left(\frac{std(\text{load}_{1:E}(X))}{\text{mean}(\text{load}_{1:E}(X))}\right)^2$$

wherein E is a number of the plurality of expert modules.

10. The system of claim 1, wherein processing, for each patch of the plurality of patches, the patch using the corresponding expert module comprises processing the patches in parallel across the expert modules.

11. The system of claim 1, wherein a number of the plurality of expert modules is greater than a number of the plurality of patches.

12. The system of claim 1, wherein the block output of a final network block in the sequence of network blocks is the network output, or wherein the block output of the final network block in the sequence of network blocks is further processed using one or more neural network layers to generate the network output.

13. The system of claim 1, wherein:

the network output is a classification output that includes a respective score corresponding to each of multiple categories, the network output is an element-level classification output that includes, for each of one or more elements in the image, a respective score corresponding to each of multiple categories, the network output is a regression output that estimates one or more continuous variables that characterize the image, or the neural network is configured to process multiple images that are video frames to generate an output that characterizes the video frames.

14. One or more non-transitory computer-readable storage media storing instructions that when executed by one or more computers cause the one more computers to implement a neural network that is configured to process an input image and to generate a network output for the input image, the neural network comprising a sequence of one or more network blocks that are each configured to perform operations comprising:

obtaining a block input that represents an intermediate representation of the input image;

determining a plurality of patches of the block input or of an updated representation of the block input, wherein each patch comprises a different subset of elements of the block input or of the updated representation of the block input;

assigning each patch to one or more respective expert modules of a plurality of expert modules of the network block;

for each patch of the plurality of patches, processing the patch using the one or more corresponding expert modules to generate one or more respective module outputs; and generating a block output that is an updated representation of the input image and that has a same dimensionality as the block input by combining the module outputs generated by the respective expert modules.

15. A method performed by one or more computers, the method comprising:

receiving an input image; and processing the input image using a neural network to generate a network output for the input image, the neural network comprising a sequence of one or more network blocks that are each configured to perform operations comprising:

obtaining a block input that represents an intermediate representation of the input image;

determining a plurality of patches of the block input or of an updated representation of the block input, wherein each patch comprises a different subset of elements of the block input or of the updated representation of the block input;

assigning each patch to one or more respective expert modules of a plurality of expert modules of the network block;

for each patch of the plurality of patches, processing the patch using the one or more corresponding expert modules to generate one or more respective module outputs; and generating a block output that is an updated representation of the input image and that has a same dimensionality as the block input by combining the module outputs generated by the respective expert modules.

16. The method of claim 15, wherein assigning each patch to one or more respective experts module of the network block comprises:

processing the patch using a routing subnetwork to generate, for each expert module of the plurality of expert modules, a respective routing score;

determining one or more highest routing scores of the plurality of routing scores; and assigning the patch to the expert module corresponding to each of the one or more highest routing scores.

17. The method of claim 16, wherein processing the patch using a routing subnetwork to generate, for each expert module of the plurality of expert modules, a respective routing score comprises:

processing the patch using one or more feedforward neural network layers to generate a respective first intermediate routing score for each expert module;

sampling, for each expert module, a noise value and adding the noise value to the first intermediate routing score of the expert module to generate a second intermediate routing score for the expert module;

applying, for each expert module, a non-linear activation function to the second intermediate routing score of the expert module to generate the routing score for the expert module.

18. The method of claim 17, wherein, for each patch of the plurality of patches, processing the patch using the one or more corresponding expert modules to generate one or more respective module outputs comprises:

processing, for each of the one or more expert modules corresponding to the patch, the patch using the expert module to generate a respective initial module output; and scaling, for each of the one or more expert modules corresponding to the patch, the corresponding initial module output according to the routing score corresponding to the expert module and the patch.

19. The method of claim 17, wherein the neural network has been trained using one or more of:

an importance loss that encourages the routing scores corresponding to each expert module to have a same measure of central tendency, or a load loss that encourages respective likelihoods that each expert module is assigned a patch to have a same measure of central tendency.

20. The method of claim 19, wherein determining the importance loss $\mathcal{L}_{imp}(X)$ for a batch of training images X comprises:

for each expert module i, computing:

$$imp_i(X) = \sum_{x \in X} f_i(x)$$

wherein $f_i$ is a function defined by the routing subnetwork for computing the routing score for the expert module i or an intermediate routing score for the expert module i; and computing the importance loss $\mathcal{L}_{imp}(X)$ to encourage, for each expert module i, $imp_i(X)$ to have a same measure of central tendency.

* * * * *